United States Patent [19]

Sano et al.

[11] Patent Number: 5,463,001
[45] Date of Patent: Oct. 31, 1995

[54] PROCESS FOR PREPARING POLYOLEFINS

[75] Inventors: Akira Sano; Takeichi Shiraishi, both of Kawasaki; Kunihiro Suzuki, Yokohama; Mitsuo Okamoto, Yokohama; Katumi Usui, Yokohama; Hiroyuki Shimizu; Kazuo Matsuura, both of Tokyo, all of Japan

[73] Assignee: Nippon Oil Company, Limited, Tokyo, Japan

[21] Appl. No.: 6,695

[22] Filed: Jan. 21, 1993

Related U.S. Application Data

[63] Continuation of Ser. No. 661,910, Feb. 27, 1991, abandoned.

[30] Foreign Application Priority Data

Mar. 2, 1990 [JP] Japan ................................ 2-50823

[51] Int. Cl.$^6$ .................................................. C08F 4/656
[52] U.S. Cl. ........................ 526/124.5; 526/129; 502/115
[58] Field of Search .................................. 526/114, 119, 526/125, 129; 502/115

[56] References Cited

U.S. PATENT DOCUMENTS

| | | | |
|---|---|---|---|
| 3,701,766 | 10/1972 | Delbouille et al. | 526/129 |
| 4,154,915 | 5/1979 | Matsuura et al. | 526/124 |
| 4,302,566 | 11/1981 | Karol et al. | 526/125 |
| 4,396,534 | 8/1983 | Matsuura et al. | 526/125 |
| 4,613,581 | 9/1986 | Maruyama et al. | 526/125 |
| 4,732,882 | 3/1988 | Allen et al. | 502/104 |

FOREIGN PATENT DOCUMENTS

| | | | |
|---|---|---|---|
| 2521662 | 11/1975 | Germany | 526/125 |
| 1292853 | 10/1972 | United Kingdom | |

Primary Examiner—Romulo H. Delmendo
Attorney, Agent, or Firm—Dilworth & Barrese

[57] ABSTRACT

Polyolefins exhibiting better particle properties are prepared by polymerizing an olefin or olefins in the presence of a catalyst comprising a solid catalyst component and an organometallic compound, said solid catalyst component being prepared by the reaction of the following components [I] and [II]:

[I] a reaction product obtained by reacting the following components (1), (2) and (3) with one another in the presence of a compound represented by the general formula ROH wherein R is a hydrocarbon radical having 1 to 20 carbon atoms or an organic residue containing such an element as oxygen, nitrogen, sulfur, or chlorine:

(1) a silicon oxide and/or an aluminum oxide;

(2) a reaction product obtained by the reaction of a magnesium halide and compound represented by the general formula $Me(OR)_nX_{z-n}$ wherein Me represents an element of Groups I to IV in the Periodic Table, z represents the valence of the element Me, n is $0 < n \leq z$, X is a halogen atom, and R is a hydrocarbon radical having 1 to 20 carbon atoms; and (3) a titanium compound represented by the general formula $Ti(OR)_nX_{4O-n}$ wherein R is a hydrocarbon radical having 1 to 20 carbon atoms, X is a halogen atom, and n is $0 \leq n \leq 4$; and

[II] an organoaluminum compound represented by the general formula $Al(OR^1)_mR^2_nX_{3-(m+n)}$ wherein $R^1$ and $R^2$ are each a hydrocarbon radical having 1 to 24 carbon atoms, X is hydrogen atom or a halogen atom, and m and n are $0 < m < 3$ and $0 < n < 3$ provided $0 < m+n \leq 3$.

12 Claims, No Drawings

PROCESS FOR PREPARING POLYOLEFINS

This is a continuation, of application Ser. No. 07/661,910 filed on Feb. 27,1991, now abandoned.

BACKGROUND OF THE INVENTION

The present invention relates to a process for preparing novel polyolefins. More particularly, the present invention is concerned with a process for preparing polyolefins exhibiting better particle properties with increase of average particle diameter, which process is capable of greatly increasing the polymer yield per solids and that per transition metal, thereby permitting the omission of the step of removing catalyst remaining in the resulting polymer, further capable of increasing the bulk density of the polymer and decreasing a fine particulate portion of the polymer.

Heretofore, in this technical field there have been known many catalysts comprising inorganic magnesium solids as carriers such as magnesium halide, magnesium oxide and magnesium hydroxide and a transition metal compound such as a titanium compound or a vanadium compound supported on the carriers. However, the polyolefins obtained in the prior art are generally low in bulk density, relatively small in average particle diameter and generally wide in particle size distribution so contain a large proportion of fine particles. For this reason, improvement has keenly been desired from the standpoint of productivity and polymer handling. Besides, when these powdery polymers are subjected to forming, there arise problems such as dusting and lowering of the forming efficiency. So there has been a keen desire for the foregoing increase of bulk density and decrease of the fine particulate portion. Further, still further improvements are considered necessary in order to satisfy the recent keen desire for omitting the pelletizing step and using a powdery polymer directly in a processing machine.

The present inventors have previously found a novel catalyst component with the above drawbacks remedied and already filed patent applications thereon (see Japanese Patent Publication Nos. 11651/1989 and 12289/1989 and Japanese Patent Laid-Open Nos. 149605/1985, 32105/1987 and 207306/1987). The use of this catalyst component can afford a polymer having a high bulk density and a large average particle diameter. However, a further improvement has been considered necessary for omitting the pelletizing step and using a powdery polymer directly in a processing machine.

It is the object of the present invention to remedy the above-mentioned drawbacks and obtain in extremely high activity a polymer having a high bulk density, a narrow particle size distribution, an extremely reduced proportion of fine particles, and superior in fluidity.

SUMMARY OF THE INVENTION

The present invention resides in a process for preparing a polyolefin by polymerizing or copolymerizing an olefin or olefins in the presence of a catalyst comprising a solid catalyst component and an organo-metallic compound, said solid catalyst component being prepared by the reaction of the following components [I] and [II]:

[I] a reaction product obtained by reacting the following components (1), (2) and (3) with one another in the presence of a compound represented by the general formula ROH wherein R is a hydrocarbon radical having 1 to 20 carbon atoms or an organic residue containing such an element as oxygen, nitrogen, sulfur, or chlorine:
  (1) a silicon oxide and/or an aluminum oxide;
  (2) a reaction product obtained by the reaction of a magnesium halide and a compound represented by the general formula $Me(OR)_nX_{z-n}$ wherein Me represents an element of Groups I to IV in the Periodic Table, z represents the valence of the element Me, n is $0<n\leq z$, X is a halogen atom, and R is a hydrocarbon radical having 1 to 20 carbon atoms; and
  (3) a titanium compound represented by the general formula $Ti(OR)_nX_{4-n}$ wherein R is a hydrocarbon radical having 1 to 20 carbon atoms, X is a halogen atom, and n is $0<n\leq 4$; and

[II] an organoaluminum compound represented by the general formula $Al(OR^1)_mR^2_nX_{3-(m+n)}$ wherein $R^1$ and $R^2$ are each a hydrocarbon radical having 1 to 24 carbon atoms, X is hydrogen atom or a halogen atom, and m and n are $0<m<3$ and $0<n<3$ provided $0<m+n\leq 3$.

By the process of the present invention there is obtained, in extremely high activity, a polyolefin having a relatively large average particle diameter, a narrow particle size distribution and a reduced proportion of fine particles. Besides, the bulk density and free fluidity of the polyolefin are high. These characteristics are very advantageous to the polymerization operation. Further, the polyolefin prepared by the process of the present invention can be subjected to forming not only as pellets but also in the form of powder, without causing any trouble.

It is also a characteristic feature of the present invention that the polymer obtained using the catalyst specified in the present invention is extremely narrow in its molecular weight distribution and small in the amount thereof extracted in hexane, and that the amount of low grade polymers by-produced is very small. Therefore, when film is formed using the polyolefin of a narrow molecular weight distribution prepared by the process of the present invention, it has a lot of merits, for example, high transparency, superior anti-blocking property and heat-sealability.

DETAILED DESCRIPTION OF THE INVENTION

The present invention will be described concretely hereinunder.

The catalyst used in the polyolefin preparing process of the present invention comprises a solid catalyst component and an organometallic compound, said solid catalyst component being prepared by reacting the following components [I] and [II :

[I] a reaction product obtained by reacting the following components (1), (2) and (3) with one another in the presence of a compound represented by the general formula ROH:
  (1) a silicon oxide and/or an aluminum oxide;
  (2) a reaction product obtained by the reaction of a magnesium halide and a compound represented by the general formula $Me(OR)_nX_{z-n}$; and
  (3) a titanium compound represented by the general formula $Ti(OR)_nX_{4-n}$; and

[II] an organoaluminum compound represented by the general formula $Al(OR^1)R^2X_{3-(m+n)}$.

<1> Solid Catalyst Component

1. Component [I]

(1) The silicon oxide used in the present invention is silica or a double oxide of silicon and at least one other metal selected from Groups I–VIII of the Periodic Table.

The aluminum oxide used in the present invention is alumina or a double oxide of aluminum and at least one other metal selected from Groups I–VIII in the Periodic Table.

As typical examples of the double oxide of silicon or aluminum and at least one other metal selected from Groups I–VIII in the Periodic Table there are mentioned various natural and synthetic double oxides such as $Al_2O_3 \cdot MgO$, $Al_2O_3 \cdot CaO$, $Al_2O_3 \cdot SiO_2$, $Al_2O_3 \cdot MgO \cdot CaO$, $Al_2O_3 \cdot MgO \cdot SiO_2$, $Al_2O_3 \cdot CuO$, $Al_2O_3 \cdot Fe_2O_3$, $Al_2O_3 \cdot NiO$ and $SiO_2 \cdot MgO$. It is to be noted that these formulae are not molecular formulae but represent only compositions and that the structure and component ratio of the double oxide used in the present invention are not specially limited thereby. It goes without saying that the silicon oxide and/or aluminum oxide used in the present invention may have a small amount of water absorbed therein or may contain a small amount of impurities.

Although the properties of the silicon oxide and/or aluminum oxide used in the present invention are not specially limited so far as the objects of the present invention are not adversely affected thereby, a silica having a particle diameter of 1 to 200 μm, an average pore volume of greater than 0.3 ml/g and a surface area of greater than 50 m²/g and a it is preferably calcined at 200°–800° C. by a conventional method prior to use.

(2) As the magnesium halide there is used a substantially anhydrous one. Examples are magnesium dihalides such as magnesium fluoride, magnesium chloride, magnesium bromide, and magnesium iodide, with magnesium chloride being particularly preferred.

These magnesium halides may have been treated with electron donors such as alcohols, esters, ketones, carboxylic acids, ethers, amines, and phosphines.

As examples of the compound of the general formula $Me(OR)_nX_{z-n}$ used in the present invention wherein Me represents an element of Groups I to IV in the Periodic Table, z represents the valence of the element Me, n is $0<n\leq a$, X is a halogen atom, and R is a hydrocarbon residue having 1 to 20, preferably 1 to 8, carbon atoms such as, for example, alkyl, aryl, or aralkyl, and Rs may be the same or different, there are mentioned compounds represented by NaOR, $Mg(OR)_2$, $Mg(OR)X$, $Ca(OR)_2$, $Zn(OR)_2$, $Cd(OR)_2$, $B(OR)_3$, $Al(OR)_3$, $Al(OR)_2X$, $Al(OR)X_2$, $Si(OR)_4$, $Si(OR)_3X$, $Si(OR)_2X_2$, $Si(OR)X_3$, and $Sn(OR)_4$. More concrete and preferred examples are $Mg(OC_2H_5)_2$, $Mg(OC_2H_5)Cl$, $B(OC_2H_5)_3$, $B(OC_3H_7)_3$, $Al(OCH_3)_3$, $Al(OC_2H_5)_3$, $Al(On-C_3H_7)_3$, $Al(Oi-C_3H_7)_3$, $Al(On-C_4H_9)_3$, $Al(Osec-C_4H_9)_3$, $Al(Ot-C_4H_9)_3$, $Al(OCH_3)_2Cl$, $Al(OC_2H_5)_2Cl$, $Al(OC_2H_5)Cl_2$, $Al(Oi-C_3H_7)_2Cl$, $Al(Oi-C_3H_7)Cl_2$, $Al(OC_6H_5)_3$, $Al(OC_6H_5)_2Cl$, $Al(OC_6H_5)Cl_2$, $Al(OC_6H_4CH_3)_3$, $Al(OC_6H_4CH_3)_2Cl$, $Al(OC_6H_4CH_3)Cl_2$, $Al(OCH_2C_6H_5)_3$, $Si(OC_2H_5)_4$, $Si(OC_2H_5)_3Cl$, $Si(OC_2H_5)_2Cl_2$, $Si(OC_2H_5)Cl_3$, $Si(OC_6H_5)_4$, $Si(OC_6H_5)_3Cl$, $Si(OC_6H_5)_2Cl_2$, $Si(OC_6H_5)Cl_3$, $Si(OCH_2C_6H_5)_4$. It is preferable that the reaction ratio of the compound of the general formula $Me(OR)_nX_{z-n}$ to the magnesium halide is in the range of 0.01 to 10, preferably 0.1 to 5 in terms of Me/Mg (molar ratio).

The method of reaction between the magnesium halide and the compound of the general formula $Me(OR)_nX_{z-n}$ is not specially limited. There may be adopted a method in which both components are copulverized using, for example, ball mill, vibration mill, rod mill, or impact mill, at a temperature of 0° to 200° C., for 30 minutes to 50 hours, in the presence or absence of an inert hydrocarbon solvent.

Or there may be adopted a method in which both components are mixed and reacted together under heating at a temperature of 20° to 400° C., preferably 50° to 300° C., for 5 minutes to 10 hours, in an organic solvent selected from inert hydrocarbons, alcohols, phenols, ethers, ketones, esters, nitriles and mixtures thereof, and thereafter the solvent is evaporated off. The method of co-pulverizing the two is preferred in the present invention.

(3) As examples of the titanium compound of the general formula $Ti(OR)_nX_{4-n}$ used in the present invention wherein R is a hydrocarbon radical having 1 to 20, preferably 1 to 12, carbon atoms such as an alkyl, aryl or aralkyl group, X is a halogen atom, and n is $0\leq n \leq 4$, there are mentioned titanium tetrahalides (e.g. titanium tetrachloride, titanium tetrabromide, titanium tetraiodide), monomethoxytrichlorotitanium, dimethoxydichlorotitanium, trimethoxymonochlorotitanium, tetramethoxytitanium, monoethoxytrichlorotitanium, monoethoxytrifluorotitanium, monomethoxytrichlorotitanium, diethoxydifluorotitanium, diethoxydichlorotitanium, diethoxydibromotitanium, triethoxyfluorotitanium, triethoxychlorotitanium, tetraethoxytitanium, monopropoxytrichlorotitanium, dipropoxydichlorotitanium, diisopropoxydichlorotitanium, diisopropoxydibromotitanium, tripropoxyfluorotitanium, tripropoxychlorotitanium, tetra-n-propoxytitanium, tetraisopropoxytitanium, monobutoxytrichlorotitanium, monoisobutoxytrichlorotitanium, dibutoxydichlorotitanium, diisopropoxydichlorotitanium, tributoxyfluorotitanium, tributoxychlorotitanium, triisobutoxychlorotitanium, tetra-n-butoxytitanium, tetraisobutoxytitanium, tetra-sec-butoxytitanium, tetra-tert-butoxytitanium, monopentoxytrichlorotitanium, dipentoxydichlorotitanium, tripentoxymonochlorotitanium, tetra-n-pentyloxytitanium, tetra-cyclopentyloxytitanium, monooctyloxytrichlorotitanium, dioctyloxydichlorotitanium, trioctyloxymonochlorotitanium, tetra-n-hexyloxytitanium, tetracyclohexyloxytitanium, tetra-n-heptyloxytitanium, tetra-n-octyloxytitanium, mono-2-ethylhexyloxytrichlorotitanium, di-2-ethylhexyloxy-dichlorotitanium, tri-2-ethylhexyloxy-monochlorotitanium, tetra-2-ethylhexyloxytitanium, tetra-nonyloxytitanium, tetra-decyloxytitanium, tetraisobornyloxytitanium, tetraoleyloxytitanium, tetraallyloxytitanium, tetrabenzyloxytitanium, tetrabenzhydryloxytitanium, monophenoxytrichlorotitanium, diphenoxydichlorotitanium, triphenoxychlorotitanium, tri-o-xylenoxychlorotitanium, tetraphenoxy-titanium, tetra-o-methylphenoxytitanium, tetra-m-methylphenoxytitanium, tetra-1-naphthyloxytitanium, tetra-2-naphthyloxytitanium and mixtures thereof. Among them, titanium tetrachloride, monoethoxytrichlorotitanium, diethoxydichlorotitanium, monobutoxytrichlorotitanium, dibutoxydichlorotitanium, tetraethoxytitanium, tetraisopropoxytitanium, tetra-nbutoxytitanium, tetra-n-hexyloxytitanium, tetra-n-octyloxytitanium and tetra-2-ethylhexyloxytitanium are preferred. (4) The component [I] used in the present invention is prepared by reacting together (1) a silicon oxide and/or an aluminum oxide (component [I]-(1)), (2) a reaction product obtained by the reaction of a magnesium halide and a compound of the general formula $Me(OR)_nX_{z-n}$ (component [I]-(2)) and (3) a titanium compound of the general formula $Ti(OR')_mX_{4-m}$ (component [I]-(3)) in the presence of a compound of the general formula ROH.

Compounds of the general formula ROH are those wherein R is a hydrocarbon radical having 1 to 20, preferably 6 to 12, carbon atoms, or an organic residue containing such an element as oxygen, nitrogen, sulfur, or chlorine. Preferred examples of such hydrocarbon radical are alkyl, alkenyl, aryl and aralkyl. Particularly preferred are those having a branch structure. As examples of the compound of the general formula ROH there are mentioned methanol, ethanol, 1-propanol, 2-propanol, 1-butanol, 2-methyl-1-propanol, 2-butanol, 2-methyl-2-propanol, 1-pentanol, 2-pentanol, 3-pentanol, 2-methyl-1-butanol, 3-methyl-1-butanol, 2-metyl-2-butanol, 3-metyl-2-butanol, 2, 2-dimetyl-propanol, 1-hexanol, 2-methyl-1-pentanol, 4-methyl- 1-pentanol, 4-methyl-2-pentanol, 2-ethyl- 1-butanol, 1-heptanol, 2-heptanol, 3-heptanol, 4-heptanol, 2, 4-dimethyl-3-pentanol, 1-octanol, 2-octanol, 2-ethyl- 1-hexanol, 3, 5-dimethyl- 1-hexanol, 2, 2, 4-trimethyl-1-pentanol, 1-nonanol, 5-nonanol, 3, 5-dimethyl-4-heptanol, 2, 6-dimethyl-4-heptanol, 3, 5, 5-trimethyl-1-hexanol, 1-decanol, 1-undecanol, 1-dodecanol, 2, 6, 8-trimethyl-4-nonanol, 1-tridecanol, 1-pentadecanol, 1-hexadecanol, 1-heptadecanol, 1-octadecanol, 1-nonadecanol, 1-eicosanol, phenol, chlorophenol, benzyl alcohol, methyl cellosolve, and mixtures thereof. Particularly, 2-methyl- 1-pentanol, 4-methyl- 1-pentanol, 4-methyl-2-pentanol, 2-ethyl- 1-butanol, 2, 4-dimethyl-3-pentanol, 2-ethyl-l-hexanol, 3, 5-dimethyl- 1-hexanol, 2,2, 4-trimethyl-l-pentanol, 3, 5-dimethyl-4-heptanol, 2,6-dimethyl-1-heptanol and 3, 5, 5-trimethyl-1-hexanol are preferred. Of course, various denatured alcohols available commercially as industrial alcohols such as methanol-denatured ethanol and hexane denatured ethanol are also employable without any trouble.

How to react the components [I]-(1) to [I]-(3) in the preparation of component [I] is not specially limited provided the reaction is conducted in the presence of a compound of the general formula ROH. These components may be reacted with one another in any of the following orders:

(A) Components [I]-(1) to [I]-(3) are contacted at a time.

(B) Components [I]-(1) and [I]-(2) are contacted together, followed by contact with component [I]-(3).

(C) Components [I]-(1) and [I]-(3) are contacted together, followed by contact with component [I]-(2).

(D) Components [I]-(2) and [I]-(3) are contacted together, followed by contact with component [I]-(1). The above method (D) is preferred. More preferably, components [I]-(2) and [I]-(3) are dissolved and contacted together in advance, using a compound of the general formula ROH as a solvent, followed by contact with component [I]-(1). In what order the components [I]-(2) and [I]-(3) should be dissolved in the compound of the general formula ROH is not specially limited. Both may be dissolved at a time, or one may precede the other.

There also may be adopted the following method. Component [I]-(2) and/or component [I]-(3) are (is) dissolved beforehand in a compound having a smaller number of carbon atoms than the compound of the general formula ROH, namely a compound having 1 to 5 carbon atoms, which is a so-called lower alcohol, and thereafter the components to be reacted are contacted together using the lower alcohol solution containing the component [I]-(2) and/or the component [I]-(3) and in the presence of the compound of the general formula ROH.

According to a preferred method of contacting the components [I]-(1) to [I]-(3), these components are contacted, mixed and reacted in accordance with any of the foregoing contacting orders at a temperature of 20–300° C., preferably 50°–150° C., for 1 minute to 48 hours, preferably 1 to 5 hours, in the presence of a compound of the general formula ROH, and thereafter the compound of the general formula ROH is removed by the reduction of pressure and/or heating.

As to the reaction ratio of the components, it is desirable to react the components [I]-(1) and [I]-(2) in such a manner that the magnesium content in the component [I]-(2) becomes 0.01 to 20 mmol, preferably 0.1 to 10 retool, more preferably 0.2 to 4.0 mmol, per gram of the component [I]-(1). As to the components [I]-(1) and [I]-(3), it is preferable that the reaction be carried out using 0.01–10.0 mmol, preferably 0.1–5.0 retool, more preferably 0.2–2.0 retool, of component [I]-(3) per gram of component [I]-(1), although this ratio differs depending on whether the component [I]-(1) is subjected to a calcining treatment or not or conditions for the calcining treatment if applied.

As to the amount of the compound of the general formula ROH to be used, it is desirable to use this compound in an amount of 0. 1 to 50 g, preferably 1 to 30 g, per gram of component [I]-(2 ).

2. Component [II]

The organoaluminum compound of the general formula $Al(OR^1)_m R^2_n X_{3-(m+n)}$ used in the present invention is one wherein $R^1$ and $R^2$ are each a hydrocarbon radical having 1 to 24, preferably 1 to 12, carbon atoms such as an alkyl, aryl or aralkyl group, X is hydrogen atom or a halogen atom such as a bromine, chlorine or iodine atom and m and n are $0<m<3$ and $0<n<3$ provided $0<m+n \leq 3$. Examples of such organoaluminum compound are dimethylaluminum methoxide, dimethylaluminum ethoxide, dimethylaluminum isopropoxide, dimethylaluminum t-butoxide, dimethylaluminum n-butoxide, dimethylaluminum sec-butoxide, diethylaluminum methoxide, diethylaluminum ethoxide, diethylaluminum isopropoxide, diethylaluminum n-butoxide, diethylaluminum sec-butoxide, diethylaluminum cyclohexyloxide, diethylaluminum t-butoxide, dipropylaluminum ethoxide, dipropylaluminum t-butoxide, dibutylaluminum t-butoxide, di-i-butylaluminum methoxide, di-i-butylaluminum ethoxide, di-i-butylaluminum isopropoxide, di-i-butylaluminum i-butoxide, di-i-butylaluminum t-butoxide, di-t-butylaluminum ethoxide, di-t-butylaluminum t-butoxide, dimethylaluminum phenoxide, di-n-hexylaluminum ethoxide, di-n-hexylaluminum isopropoxide, ethylethoxyaluminum chloride, isobutylethoxyaluminum chloride, ehylphenoxy-aluminum chloride, phenylethoxyaluminum chloride, ethylethoxyaluminum hydride, ehylmethoxyaluminum chloride, ethylisopropoxyaluminum chloride, ethylbutoxyaluminum chloride and the like.

3. Preparation of Solid Catalyst Component

The solid catalyst component used in the present invention is obtained by reacting the components [I] and [II]. In this case, how to contact both components with each other is not specially limited. For example, according to a preferred method, both components are mixed and reacted together under heating at a temperature of 0° to 300° C., preferably 20° to 150° C., for 5 minutes to 10 hours, in inert to conventional Ziegler catalysts, such as, for example, pentane, hexane, cyclohexane, heptane, octane, nonane, decane, benzene, toluene, or xylene, and thereafter the solvent is removed by evaporation.

Preferably, the components [I] and [II] are reacted together at a reaction ratio in the range of 0.01 to 100, preferably 0.2 to 10, more preferably 0.2 to 5, in terms of component [II]/{component [I]-(3) in component [I]} (molar ratio).

Of course, the reactions for the preparation of the component [I] and the solid catalyst component should be performed in an inert gas atmosphere, and moisture should be avoided.

<2> Organometallic Compound

The catalyst used in the present invention comprises the above mentioned solid catalyst component and an organometallic compound.

As the organometallic compound used in the present invention, there may be preferably employed an organometallic compound of a metal of Groups I–IV in the Periodic Table which is known as a component of Ziegler type catalyst. Particularly preferred are organoaluminum compounds and organozinc compounds. To illustrate these compounds, mention may be made of organoaluminum compounds of the general formulae $R_3Al$, $R_2AlX$, $RAlX_2$, $R_2AlOR$, $RAl(OR)X$ and $R_3Al_2X_3$ wherein R, which may be the same or different, is an alkyl or aryl group having 1 to 20 carbon atoms and X is a halogen atom, as well as organozinc compounds of the general formula $R_2Zn$ wherein R, which may be the same or different, is an alkyl group having 1 to 20 carbon atoms. Concrete examples are trimethylaluminum, triethylaluminum, triisopropylaluminum, triisobutylaluminum, tri-sec-butylaluminum, tri-tertbutylaluminum, trihexylaluminum, trioctylaluminum, diethylaluminum chloride, diisopropylaluminum chloride, diethylaluminum ethoxide, ethylaluminum sesquichloride, diethylzinc, and mixtures thereof.

The amount of the organometallic compound used is not specially limited. But usually it is in the range of 0.1 to 1,000 moles per mole of the titanium compound.

It is also preferable in the present invention that the organometallic compound component be used as a mixture or addition compound of the organometallic compound and an organic acid ester.

Where the organometallic compound component is used as a mixture of the organometallic compound and an organic acid ester, the organic acid ester is used usually in an amount of 0.1 to 1 mole, preferably 0.2 to 0.5 mole, per mole of the organometallic compound. Where it is used as an addition compound of the organo-metallic compound and the organic acid ester, the molar ratio is preferably in the range of 2:1 to 1:2.

The organic acid ester is the ester of a saturated or unsaturated, mono- or dibasic organic carboxylic acid having 1 to 24 carbon atoms and an alcohol having 1 to 30 carbon atoms. Examples are methyl formate, ethyl acetate, amyl acetate, phenyl acetate, octyl acetate, methyl methacrylate, ethyl stearate, methyl benzoate, ethyl benzoate, n-propyl benzoate, iso-propyl benzoate, butyl benzoate, hexyl benzoate, cyclopentyl benzoate, cyclohexyl benzoate, phenyl benzoate, benzoic acid-4-tolyl, methyl salicylate, ethyl salicylate, methyl p-hydroxybenzoate, ethyl p-hydroxybenzoate, phenyl salicylate, cyclohexyl p-hydroxybenzoate, benzyl salicylate, ethyl α-resorcinol carboxylate methyl anisate, methyl p-ethoxybenzoate, methyl p-toluylate, ethyl p-toluylate, phenyl p-toluylate, ethyl o-toluylate, ethyl m-toluylate, methyl p-aminobenzoate, ethyl p-aminobenzoate, vinyl benzoate, allyl benzoate, benzyl benzoate, methyl naphthoate, and ethyl naphthoate.

Particularly preferred are alkyl esters, especially methyl esters, of benzoic acid, o- or p-toluic acid and anisic acid.

<3> Polymerization of Olefin

The olefin polymerization using the catalyst of the present invention can be performed in the form of slurry polymerization, solution polymerization or vapor phase polymerization. The catalyst used in the present invention is particularly suitable for vapor phase polymerization. The polymerization reaction is carried out in the same way as in the conventional olefin polymerization reaction using a Ziegler type catalyst. More particularly, the reaction is performed in a substantially oxygen- and water-free condition in the presence or absence of an inert hydrocarbon. Olefin polymerizing conditions involve temperatures in the range of 20° to 120° C., preferably 50° to 100° C., and pressures in the range of atmospheric pressure to 70 kg/cm$^2$, preferably 2 to 60 kg/cm$^2$. Adjustment of the molecular weight can be done to some extent by changing polymerization conditions such as the polymerization temperature and the catalyst mole ratio, but the addition of hydrogen into the polymerization system is more effective for this purpose. Of course, using the catalyst of the present invention, there can be performed two or more multi-stage polymerization reactions involving different polymerization conditions such as different hydrogen concentrations and different polymerization temperatures.

The process of the present invention is applicable to the polymerization of all olefins that can be polymerized using a Ziegler type catalyst, preferably α-olefins having 2 to 12 carbon atoms. For example, it is suitable for the homopolymerization of such α-olefins as ethylene, propylene, 1-butene, 1-hexene and 4-methyl-1-pentene and the copolymerization of ethylene and an α-olefin having 3–12 carbon atoms such as propylene, 1-butene, 1-hexene and 4-methylpentene-1, the copolymerization of propylene and 1-butene and the copolymerization of ethylene and one or more α-olefins.

Copolymerization with dienes is also preferable for the modification of polyolefins. Examples of diene compounds which may be used for this purpose are butadiene, 1,4-hexadiene, ethylidene norbornene and dicyclopentadiene. The comonomer content in the copolymerization may be selected optionally. For instance, when ethylene and a α-olefin having 3–12 carbon atoms is copolymerized, the α-olefin content in the copolymer is preferably 0–40 molar %, more preferably 0–30 molar %.

<Effects of the Invention>

Homopolymers or copolymers of olefins prepared by using as catalyst the solid catalyst component and the organometallic compound in the present invention are remarkably high in bulk density, relatively large in average particle diameter and narrow in particle size distribution and have a reduced proportion of fine particles, so there is little adhesion of polymer to the reactor walls during polymerization thus permitting stable operations. Besides, not only dusting can be prevented in a forming operation and so the efficiency of the forming operation can be enhanced, but also it is possible to omit a pelletizing step.

Further, since the homopolymers or copolymers in question according to the present invention are narrow in molecular weight distribution, they can be formed into films having high strength and superior in transparency and also superior in anti-blocking property and heat-sealability.

<Examples>

The following examples are given to further illustrate the present invention and for practicing the invention, but it is to be understood that the invention is not limited thereto.

[How to Measure Physical Properties of Polymer]

Melting Point

Using a differential scanning calorimeter (DSC) (a product of Seiko Denshi K. K. ), a polymer sample weighing 5 mg is once melted at 180° C. and then cooled to −40° C., thereafter the temperature is raised at a rate of 10° C./min and the temperature corresponding to an endothermic peak top is regarded as the melting point of the polymer.

Hexane Extraction

A copolymer powder is roll-milled at 180° C. and then pressed into a 5 cm×5 cm×0.2 mm sheet, thereafter the sheet is extracted in boiling hexane for 5 hours and the percent reduction in weight is regarded as hexane extraction.

EXAMPLE 1

(a) Preparation of Solid Catalyst Component 10 g of a commercially available, anhydrous magnesium chloride and 4.2 g of aluminum triethoxide were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 10 g of dehydrated titanium tetraethoxide, 100 g of 2-methyl-1-pentanol and 5.0 g of the reaction product of anhydrous magnesium chloride and aluminum triethoxide prepared above, and reaction was allowed to take place at 80° C. for 1 hour. After cooling to room temperature, 46 g of silica (Fuji-Davison #955) which had been calcined at 400° C. for 8 hours was placed in the flask and again reaction was allowed to take place at 80° C. for 2 hours followed by drying under reduced pressure at 120° C. for 2 hours to obtain a solid powder. Then, 100 cc of dehydrated hexane and 8.0 g of ethyl-ethoxyaluminum chloride were added thereto and reaction was allowed to take place at room temperature for 1 hour. Thereafter, the hexane was removed by blowing nitrogen at 60° C. for 3 hours to obtain a solid catalyst component.

(b) Vapor Phase Polymerization

A stainless steel autoclave equipped with a stirrer was used as a vapor phase polymerization apparatus, and a loop was formed using a blower, a flow control device and a dry type cyclone. The temperature of the autoclave was adjusted by passing warm water through a jacket.

The solid catalyst component prepared above and triethylaluminum were fed at rates of 250 mg/hr and 50 mmol/hr, respectively, into the autoclave held at 80° C. Also, butene-1, ethylene and hydrogen gases were fed while adjusting the butene-1/ethylene mole ratio in the internal vapor phase of the autoclave to 0.25 and also adjusting the hydrogen gas pressure to 15% of the total pressure. Polymerization was performed continuously for 10 hours while maintaining the total pressure at 8 kg/cm²G, circulating the gases in the polymerization system using the blower and withdrawing the resulting polymer intermittently.

The ethylene copolymer thus prepared was a round particulate matter having a melt flow rate (MFR) of 1.04 g/10 min. a density of 0.9205 g/cm³, a bulk density of 0.44 g/cm³ and an average particle diameter of 860 µm. Catalytic activity was 230,000 g.copolymer/g.Ti and thus extremely high. When the interior of the autoclave was checked after a continuous polymerization for 10 hours, there was found no polymer deposited on the inner wall and the stirrer.

FR value ($MFR_{10}/MFR_{2.16}$) of this copolymer represented by the ratio of a melt flow rate ($MFR_{10}$) as measured under a load of 10 kg to a melt flow rate ($MFR_{2.16}$) as measured under a load of 2.16 kg, both at 190° C. according to the method defined by ASTM-D1238-65T, was 7.4 and thus the molecular weight distribution was extremely narrow.

The melting point of this copolymer was 121.7° C. and the hexane extraction thereof was 2.7 wt %.

EXAMPLE 2

A solid catalyst component was prepared in the same way as in Example 1 except that 9.0 g of ethyliso-propoxyaluminum chloride was used in place of ethylethoxy-aluminum chloride. Using this solid catalyst component, polymerization was performed in the same manner as in Example 1.

As a result, catalytic activity was as high as 210,000 g.copolymer/g.Ti and there was obtained a round particulate matter having an MFR of 0.97 g/10 min, a density of 0.9214 g/cm³, a bulk density of 0.43 g/cm³ and an average particle diameter of 880 µm. FR value was 7.5 and thus the molecular weight distribution was narrow. Further, the melting point of the copolymer was 121.9° C. and the hexane extraction thereof was 2.8 wt %.

EXAMPLE 3

A solid catalyst component was prepared in the same way as in Example 1 except that 11.0 g of isobutyl-isopropoxyaluminum chloride was used in place of ethyl-ethoxyaluminum chloride. Using this solid catalyst component, polymerization was performed in the same manner as in Example 1.

As a result, catalytic activity was as high as 210,000 g.copolymer/g.Ti and there was obtained a round particulate matter having an MFR of 1.00 g/10 min, a density of 0.9203 g/cm³, a bulk density of 0.42 g/cm³ and an average particle diameter of 870 µm. FR value was 7.5 and thus the molecular weight distribution was narrow. Further, the melting point of the copolymer was 121.3° C. and the hexane extraction thereof was 2.5 wt %.

EXAMPLE 4

(a) Preparation of Solid Catalyst Component 10 g of a commercially available, anhydrous magnesium chloride and 4.2 g of aluminum triethoxide were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 10 g of diethoxydichlorotitanium, 20 g of 2-methyl-1-pentanol and 100 g of ethanol. After stirring at room temperature for 1 hour, 5.0 g of the reaction product of anhydrous magnesium chloride and aluminum triethoxide prepared above was put into the flask and reaction was allowed to take place at 80° C. for 1 hours. After cooling to room temperature, 46 g of silica (Fugi-Davison #955) which had been calcined at 400° C. for 3 hours was placed in the flask and again reaction was allowed to take place at 80° C. for 2 hour, followed by drying under reduced pressure at 120° C. for 2 hours to obtain a solid powder. Then, 100 cc of dehydrated hexane and 10.0 g of diethylaluminum ethoxide were added thereto and reaction was allowed to take place at room temperature for 1 hour. Thereafter, the hexane was removed by blowing nitrogen at 60° C. for 3 hours to obtain a solid catalyst component.

(b) Vapor Phase Polymerization

Using the solid catalyst component prepared above, polymerization was conducted in the same way as in Example 1. As a result, catalytic activity was as high as 220,000g. copolymer/g. Ti and there was obtained a round particulate matter having an MFR of 0.94 g/10 min, a density of 0.9221 g/cm³, a bulk density of 0.43 g/cm³ and an average particle diameter of 810 μm. FR value was 7.4 and thus the molecular weight distribution was narrow. Further, the melting point of the copolymer was 122.5° C. and the hexane extraction thereof was 2.6 wt %.

EXAMPLE 5

A solid catalyst component was prepared in the same way as in Example 4 except that 20 g of 2-ethyl-1-hexanol was used in place of 2-methyl-1-pentanol. Using this solid catalyst component, polymerization was conducted in the same manner as in Example 1.

As a result, catalytic activity was as high as 270,000 g. copolymer/g. Ti and there was obtained a round particulate matter having an MFR of 0.89 g/10 min, a density of 0.9210 g/cm³, a bulk density of 0.44 g/cm³ and an average particle diameter of 900 μm. FR value was 7.4 and thus the molecular weight distribution was narrow. Further, the melting point of the copolymer was 121.8° C. and the hexane extraction thereof was 2.9 wt %.

EXAMPLE 6

(a) Preparation of Solid Catalyst Component 10 g of a commercially available, anhydrous magnesium chloride and 2.2 g of aluminum triethoxide were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 15 g of tetrabutoxytitanium, 20 g of 2-ethyl-1-hexanol and 100 g of ethanol. After stirring for 1 hour at room temperature, 5.0 g of the reaction product of anhydrous magnesium chloride and aluminum triethoxide prepared above was put into the flask and reaction was allowed to take place at 80° C. for 1 hours. Then, after cooling to room temperature, 46 g of silica (Fuji-Davison #955) which had been calcined at 400° C. for 3 hours was charged into the flask and again reaction was allowed to take place at 80° C. for 2 hours, followed by drying under reduced pressure at 120° C. for 2 hours to obtain a solid powder. Then, 100 cc of dehydrated hexane and 10.0 g of ethylethoxyaluminum chloride were added thereto and reaction was allowed to proceed at room temperature for 1 hour. Thereafter, the hexane was removed by blowing nitrogen at 60° C. for 3 hours to obtain a solid catalyst component.

(b) Vapor Phase Polymerization

Using the solid catalyst component prepared above, polymerization was conducted in the same way as in Example 1. As a result, catalytic activity was as high as 260,000 g. copolymer/g. Ti and there was obtained a round particulate matter having an MFR of 1.12 g/10 min, a density of 0.9211 g/cm³, a bulk density of 0.40 g/cm³ and an average particle diameter of 880 μm. FR value was 7.5 and thus the molecular weight distribution was narrow. Further, the melting point of the copolymer was 122.1° C. and the hexane extraction thereof was 3.0 wt %.

EXAMPLE 7

(a) Preparation of Solid Catalyst Component 10 g of a commercially available, anhydrous magnesium chloride and 4.2 g of aluminum triethoxide were placed in a stainless steel pot having an internal volume of 400 ml and containing 25 stainless steel balls each ½ inch in diameter, and ball-milled for 16 hours at room temperature in a nitrogen atmosphere.

A three-necked flask equipped with a stirrer and a reflux condenser was purged with nitrogen and then charged with 15 g of dibutoxydichlorotitanium, 20 g of 2-ethyl-1-hexanol and 100 g of ethanol. After stirring at room temperature for 1 hour, 5.0 g of the reaction product of anhydrous magnesium chloride and aluminum triethoxide prepared above was put into the flask and reaction was allowed to take place at 80° C. for 1 hour. Then, after cooling to room temperature, 46 g of silica (Fuji-Davison #955) which had been calcined at 400° C. for 3 hours was charged into the flask and again reaction was allowed to proceed at 80° C. for 2 hours, followed by drying under reduced pressure at 120° C. for 2 hours to obtain a solid powder. Then, 100 cc of dehydrated hexane and 10.0 g of diethylaluminum ethoxide were added thereto and reaction was allowed to take place at room temperature for 1 hour. Thereafter, the hexane was removed by blowing nitrogen at 60° C. for 3 hours to obtain a solid catalyst component.

(b) Vapor Phase Polymerization

Using the solid catalyst component prepared above, polymerization was conducted in the same way as in Example 1. As a result, catalytic activity was as high as 230,000 g. copolymer/g. Ti and there was obtained a round particulate matter having an MFR of 1.07 g/10 min, a density of 0.9213 g/cm³, a bulk density of 0.42 g/cm³ and an average particle diameter of 850 μm. FR value was 7.4 and thus the molecular weight distribution was narrow. Further, the melting point of the copolymer was 122.0° C. and the hexane extraction thereof was 3.0 wt %.

EXAMPLE 8

A solid catalyst component was prepared in the same way as in Example 6 except that 4.2 g of boron triethoxide was used in place of aluminum triethoxide. Using this solid catalyst component, polymerization was carried out in the same manner as in Example 1.

As a result, catalytic activity was as high as 210,000 g. copolymer/g. Ti and there was obtained a round particulate matter having an MFR of 0.97 g/10 min., a density of 0.9207 g/cm³, a bulk density of 0.44 g/cm³ and an average particle diameter of 800 μm. FR value was 7.6 and thus the molecular weight distribution was narrow. Further, the melting point of the copolymer was 122.0° C. and the hexane extraction thereof was 3.2 wt %.

EXAMPLE 9

A solid catalyst component was prepared in the same way as in Example 6 except that 3.8 g of magnesium diethoxide was used in place of aluminum diethoxide. Using this solid catalyst component, polymerization was carried out in the same manner as in Example 1.

As a result, catalytic activity was as high as 220,000 g. copolymer/g. Ti and there was obtained a round particulate matter having an MFR of 1.08 g/10 min, a density of 0.9230 g/cm³, a bulk density of 0.42 g/cm³ and an average particle diameter of 800 μm. FR value was 7.5 and thus the molecular weight distribution was narrow. Further, the melting point of the copolymer was 122.2° C. and the hexane extraction thereof was 2.8 wt %.

EXAMPLE 10

A solid catalyst component was prepared in the same way as in Example 1 except that silica-alumina was used in place of silica. Using this solid catalyst component, polymerization was carried out in the same manner as in Example 1. As a result, catalytic activity was as high as 190,000 g. copolymer/g. Ti and there was obtained a round particulate matter having an MFR of 0.77 g/10 min, a density of 0.9234 g/cm$^3$, a bulk density of 0.40 g/cm$^3$ and an average particle diameter of 780 μm. FR value was 7.5 and thus the molecular weight distribution was narrow. Further, the melting point of the copolymer was 122.3° C. and the hexane extraction thereof was 2.9 wt %.

EXAMPLE 11

A solid catalyst component was prepared in the same way as in Example I except that alumina was used in place of silica. Using this solid catalyst component, polymerization was performed in the same nanner as in Example 1. As a result, catalytic activity was as high as 200,000 g. copolymer/g. Ti and there was obtained a round particulate matter having an MFR of 0.86 g/10 min, a density of 0.9198 g/cm$^3$, a bulk density of 0.40 g/cm$^3$ and an average particle diameter of 790 μm. FR value was 7.6 and thus the molecular weight distribution was narrow. Further, the melting point of the copolymer was 122.5° C. and the hexane extraction thereof was 3.2 wt %.

Comparative Example 1

(a) Preparation of Solid Catalyst Component 10 g of a commercially available, anhydrous magnesium chloride and 4.2 g of aluminum triethoxide were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 5 g of the above reaction product and 5 g of SiO$_2$ (Fuji-Davison #952) which had been calcined at 600° C. Then, 100 ml of tetrahydrofuran was added and reaction was allowed to take place at 60° C. for 2 hours, followed by drying under reduced pressure at 120° C. to remove the tetrahydrofuran. Thereafter, 50 cc of hexane was added and stirring was made, then 1.1 ml of titanium tetrachloride was added and reaction was allowed to take place under the reflux of hexane for 2 hours. The resulting solid catalyst component contained 40 mg of titanium per gram thereof.

(b) Vapor Phase Polymerization

Using the solid catalyst component prepared above, polymerization was conducted in the same way as in Example 1. As a result, catalytic activity was as low as 112,000 g. copolymer/g. Ti and there was obtained a particulate matter of an indeterminate form having an MFR of 12 g/10 min, a density of 0.9210 g/cm$^3$, a bulk density of 0.41 g/cm$^3$ and an average particle diameter of 700 μm. FR value was 7.6. The melting point of the copolymer was 123.2° C. and the hexane extraction thereof was 4.2 wt %.

Comparative Example 2

(a) Preparation of Solid Catalyst Component 10 g of a commercially available, anhydrous magnesium chloride and 4.3 g of triethoxyaluminum were placed in a stainless steel pot having an internal volume of 400 ml and containing 25 stainless steel balls each ½ inch in diameter, and ball-milled for 16 hours at room temperature in a nitrogen atmosphere to obtain a reaction product.

A three-necked flask equipped with a stirrer and a reflux condenser was purged with nitrogen and then charged with 100 g of dehydrated 2-methyl-1-pentanol, 2.0 g of tetra-n-ethoxytitanium and 5.0 g of the reaction product of anhydrous magnesium chloride and triethoxyaluminum prepared above, and reaction was allowed to take place at 80° C. for 1 hour, followed by drying at 120° C. under reduced pressure for 2 hours to obtain a solid powder. Then, 100 cc of dehydrated hexane and 2.0 g of diethylaluminum chloride were added and reaction was allowed to take place at room temperature for 1 hour. Thereafter, the hexane was removed by blowing nitrogen at 60° C. for 3 hours to obtain a solid catalyst component.

(b) Vapor Phase Polymerization

Using the solid catalyst component prepared above, polymerization was conducted in the same way as in Example 1. As a result, in 30 minutes after the start of the polymerization it became impossible to continue the rotation of the stirrer and so the polymerization had to be stopped. The interior of the autoclave was checked to find that melted polymer was deposited on the stirrer blades.

Comparative Example 3

(a) Preparation of Solid Catalyst Component 10 g of a commercially available, anhydrous magnesium chloride was placed in a stainless steel pot having internal volume of 400 ml and containing 25 stainless steel balls each ½ inch in diameter, and ball-milled for 16 hours at room temperature in a nitrogen atmosphere.

A three-necked flask equipped with a stirrer and a reflux condenser was purged with nitrogen and then charged with 140 cc of dehydrated ethanol, 17.0 g of dehydrated 2-ethyl-1-hexanol and 12.0 g of tetraethoxytitanium. After stirring at room temperature for 1 hour, 7.5 g of the above milled, anhydrous magnesium chloride was put into the flask and reaction was allowed to take place at 80° C. for 1 hour. Then, after cooling to room temperature, 46 g of silica (Fugi-Davison #955) which had been calcined at 400° C. for 3 hours was placed in the flask and again reaction was allowed to proceed at 80° C. for 2 hours, followed by drying at 120° C. under reduced pressure for 2 hours to obtain a solid powder. Then, 100 cc of dehydrated hexane and 10.0 g of diethylaluminum chloride were added and reaction was allowed to take place at room temperature for 1 hour. Thereafter, the hexane was removed by blowing nitrogen at 60° C. for 3 hours to obtain a solid catalyst component.

(b) Vapor Phase Polymerization

Using the solid catalyst component prepared above, polymerization was conducted in the same way as in Example 1. As a result, catalytic activity was 140,000 g.copolymer/g. Ti and there was obtained a particulate matter of an indeterminate form having an MFR of 0.98 g/10 rain, a density of 0.9220 g/cm$^3$, a bulk density of 0.38 g/cm$^3$ and an average particle diameter of 710 fire. FR value was 8.2 and thus the molecular weight distribution was relatively wide. The melting point of the copolymer was 123° C. and the hexane extraction thereof was 4.0 wt %.

What is claimed is:

1. A process for preparing a polyolefin by polymerizing or copolymerizing an olefin or olefins in the presence of a catalyst comprising a solid catalyst component and an organometallic compound, said solid catalyst component being prepared by the reaction of the following components (I) and (II):

(I) a reaction product obtained by reacting the following components (1), (2) and (3) with one another in the presence of a compound represented by the general formula ROH wherein R is an organic radical having 1 to 20 carbon atoms or a hydrocarbon radical containing a heteroatom selected from the group consisting of oxygen, nitrogen, sulfur, and chlorine:
(1) a silicon oxide and/or an aluminum oxide;
(2) a reaction product obtained by the reaction of a magnesium halide and compound represented by the general formula $Me(OR)_n X_{z-n}$ wherein Me represents an element of Groups I to IV in the Periodic Table, z represents the valence of the element Me, n is $0<n\leq z$, X is a halogen atom, and R is a hydrocarbon radical having 1 to 20 carbon atoms; and
(3) a titanium compound represented by the general formula $Ti(OR)_n X_{4-n}$ wherein R is a hydrocarbon radical having 1 to 20 carbon atoms, X is a halogen atom, and n is [O]$2\leq n\leq 4$; and (II) an organoaluminum compound represented by the general formula $Al(OR^1)_m R^2_n X_{3-(m+n)}$ wherein $R^1$ and $R^2$ are each a hydrocarbon radical having 1 to 24 carbon atoms, X is hydrogen atom or a halogen atom, and m and n and $0<m<3$ and $0<n<3$ provided $0<n<3$ provided $0<m+n\leq 3$.

2. A process of claim 1 wherein the reaction ratio of the compound of the general formula $Me(OR)_n X_{z-n}$ to the magnesium halide is in the range of 0.01 to 10 in terms of Me/Mg (molar ratio).

3. A process of claim 1 wherein the reaction ratio of the component [I]-(1) and the component [I]-(2) is 0.01 to 20.0 mmol of the magnesium halide in the component [I]-(2) per gram of the component [I]-(1).

4. A process of claim 1 wherein the reaction ratio of the components [I]-(1) and [I]-(3) is 0.01 to 10.0 mmol of the component [I]-(3) per gram of the component [I]-(1).

5. A process of claim 1 wherein the reaction ratio of the components [I] and [II] is 0.01 to 100 in terms of the component [II]/the component in the component [I] (molar ratio).

6. A process of claim 1 wherein the Me in the general formula $Me(OR)_n X_{z-n}$ is Mg, Al or Si.

7. A process of claim 1 wherein the olefin is ethylene.

8. A process of claim 1 wherein the olefins are ethylene and an α-olefin having 3–12 carbon atoms.

9. A process of claim 1 wherein the organometallic compound is an organoaluminum compound.

10. A process of claim 1 wherein the organometallic compound is used together with an organic acid ester.

11. A process of claim 1 wherein the polymerization reaction is conducted at a temperature of 20° C. to 120° C. and a pressure of atmospheric pressure to 70 kg/cm$^2$.

12. A process of claim 1 wherein the R in the general formula ROH is a hydrocarbon radical having 6 to 20 carbon atoms.

* * * * *